United States Patent
Vinod et al.

(10) Patent No.: US 9,871,708 B2
(45) Date of Patent: Jan. 16, 2018

(54) METHOD AND SYSTEM FOR RING PROTECTION SWITCHING

(75) Inventors: Kumar Madaiah Vinod, Bangalore (IN); Ojha Somnath, Mumbai (IN); Aravindakshan Jishnu, Palakkad (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 75 days.

(21) Appl. No.: 13/412,960

(22) Filed: Mar. 6, 2012

(65) Prior Publication Data

US 2012/0224471 A1 Sep. 6, 2012

Related U.S. Application Data (63) Continuation of application No. PCT/IN2010/000571, filed on Aug. 30, 2010.

(51) Int. Cl.
| | |
|---|---|
| *H04L 12/26* | (2006.01) |
| *H04L 1/00* | (2006.01) |
| *H04L 12/437* | (2006.01) |
| *H04L 12/64* | (2006.01) |

(52) U.S. Cl.
CPC ........ *H04L 43/0811* (2013.01); *H04L 12/437* (2013.01); *H04L 2001/0095* (2013.01); *H04L 2012/6437* (2013.01)

(58) Field of Classification Search
CPC .......... H04L 2001/0095; H04L 12/42–12/422; H04L 12/437; H04L 2012/6408; H04L 2012/6437

USPC ................ 370/217–218, 221–224, 242–249, 370/257–258

See application file for complete search history.

(56) References Cited

U.S. PATENT DOCUMENTS

| | | | |
|---|---|---|---|
| 7,596,313 B1 | 9/2009 | Iyer et al. | |
| 2007/0237521 A1* | 10/2007 | Meyer et al. | ................... 398/19 |
| 2008/0124074 A1 | 5/2008 | Yang et al. | |
| 2009/0003195 A1* | 1/2009 | Pitchforth, Jr. | ............... 370/218 |
| 2009/0154364 A1* | 6/2009 | Felkar et al. | ................. 370/245 |
| 2009/0316571 A1* | 12/2009 | Rose | ..................... H04L 12/437 370/218 |
| 2011/0317549 A1* | 12/2011 | Santos | .................. H04L 12/437 370/225 |

* cited by examiner

*Primary Examiner* — Eric Myers
(74) *Attorney, Agent, or Firm* — Oliff PLC (57) ABSTRACT

The present invention provides a protection switching method of a node having communication failure in a ring, in a communication network. In one embodiment, this is accomplished by checking for loss of signal (LOS) at the non-ERPS device or at least one of the node in a communication channel, checking periodically for Continuity Check Message (CCM) at both the node, wherein the CCMs are periodically transmitted from both the node through at least one non-ERPS device, appropriately setting a Remote Destination Indication (RDI) bit in the Continuity Check Message (CCM) generated from at least one node and transmits the same via the non-ERPS device or through the non-ERPS device or through a disjoint communication channel, and blocking port of the node towards the non-ERPS device upon receipt of the fault notification and transmitting signal fail notification message on both the ports in the ring.

9 Claims, 10 Drawing Sheets

METHOD AND SYSTEM FOR RING PROTECTION SWITCHING

REFERENCE TO RELATED APPLICATIONS

This application is a continuation of PCT/IN2010/000571, filed 30 Aug. 2010, which is hereby incorporated by reference. This application claims priority from Patent Application No. IN 2157/CHE/2009, filed 7 Sep. 2009, which is hereby incorporated by reference.

FIELD OF THE INVENTION

The present invention is directed to the field of data communication networks. More particularly, the present invention provides a protection switching method and system of a node having communication failure in a ring, in a communication network.

BACKGROUND OF THE INVENTION

Communication networks can be built in many different network topologies, such as a ring, mesh, linear, linear chain, tree, and the like. Conventionally, network protection is provided for at layers one and below, such as through SONET, SDH, and the like. Typical protection schemes can include Automatic Protection Switching (APS), Uni-directional Path Switched Rings (UPSRs), two and four fiber Bi-directional Line Switched Rings (BLSRs), and the like. Traditionally, networks are typically not protected using ring protection schemes at layer two (e.g., Ethernet) and above. For example, Ethernet-based access and aggregation networks are typically designed in a tree structure, and thus lack network protection.

Modern networks, such as access and aggregation networks, are moving towards Ethernet as the universal medium. Ethernet standards are evolving towards carrier-grade performance, and equipment providers today provide various different solutions for Ethernet-based network protection. For example, layer one protection can be provided through Ethernet-over-SONET or Ethernet-over-SDH solutions. To increase the bandwidth with the Ethernet-over-SONET and Ethernet-over-SDH leads to higher cost. At layer two, various solutions have been presented, such as Rapid Spanning Tree Protocol (RSTP), and Spanning Tree Protocol (STP). The main problems with these type of path protection scheme are: (1) switching time in response to a fault is relatively slow, (2) cannot offer QoS because of in-deterministic tree; and (3) complex circuitry.

Another form of providing protection switching in a layer-2 network is an Ethernet ring Protection Switching (ERPS) which is formed only of Ethernet bridges as per ITU-T G.8032v1 or v2. This network protection scheme is only restricted for bridges/switches within the chain or loop of the network. Whenever the network has to expand i.e. for a Metropolitan Area Network (MAN), the protection scheme has to include one or more aggregation devices for data transfer. The standard ITU-T G.8032 is for Layer 2 Ethernet device. There is no ring protection switching for a Non-ERPS device. And hence, connecting an ERPS chain to the Non-ERPS device will not ensure the ERPS protection of the Non-ERPS device.

For the reasons stated above, which will become apparent to those skilled in the art upon reading and understanding the specification, there is a need in the art for a protection switching method and system of a node having communication failure in a ring, in a communication network.

SUMMARY OF THE INVENTION

According to one aspect of the invention there is provided a protection switching method of a node having communication failure in a ring, in a communication network, wherein the communication failure occurred on at least one non-ERPS device or node or in a communication channel, the method including checking for loss of signal (LOS) from the non-ERPS or at-least one of the node in a communication channel, periodically checking for Continuity Check Messages (CCMs) at both the nodes, wherein the CCMs are periodically transmitted and received between each of the node through at least one non-ERPS device, transparently, appropriately setting a Remote Defect Indication (RDI) bit in the Continuity Check Message (CCM) generated from at least one node and transmits the same via the non-ERPS device or through the non-ERPS device or over a disjoint communication channel, and blocking port of the node towards the non-ERPS device upon receipt of the fault notification and transmitting signal fail notification message on both the ports in the ring.

In another aspect, the invention includes a 50 ms protection switching system of a node having communication failure in a ring, in a communication network, wherein the communication failure occur on at least one non-ERPS device or node or in a communication channel, the system includes a plurality of nodes interconnected in a ring topology, at least one non-ERPS device within the ring, and a network channel connected to each of the nodes via at least one of the non-ERPS device for transmitting and receiving Continuity Check Message (CCMs), wherein each node is configured for determining a failure condition within the communication channel, appropriately setting a Remote Defect Indicator (RDI) in the CCM and transmitting the same to the other node via the non-ERPS device or through the non-ERPS device or through a disjoint communication channel, in response to the failure condition, and blocking the port of the node towards the non-ERPS device upon receipt of the fault notification, and transmitting signal fail notification message on both the ports in the ring.

The methods and system, disclosed herein may be implemented in any means for achieving various aspects, and may be executed in a form of a machine-readable medium embodying a set of instructions that, when executed by a machine, cause the machine to perform any of the operations disclosed herein. Additional advantages and features of the present invention will be more apparent from the detailed description and accompanying drawings, which illustrate embodiments of the invention.

BRIEF DESCRIPTION OF THE DRAWINGS

FIG. 4(*a-d*) shows different modes of operation of two network nodes showing the preferred protection mechanism as termination of ERPS on IP/MPLS nodes.

DETAILED DESCRIPTION OF THE INVENTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

For the ease understanding of the invention, the IP/MPLS nodes or routers or non-ERPS (Layer 2) devices are interchangeably used in the below description.

The present invention provides a method and system for 50 ms protection switching in a layer-2 ring topology network. Specifically, the protection switching method and system of a node having communication failure in a ring, in a communication network, where the communication failure occurred on one non-ERPS device or node or in a communication channel, in a bridged, layer-2 network. The communication network may be or may include one or more network selected from a group of networks consisting of a layer-2 networks, a local area network, a metropolitan area network, a ring network and the like. The non-ERPS device may be or may include an Internet Protocol/Multiprotocol Label Switching (IP/MPLS), router, Virtual Private Local Area Network Services (VPLS), Hierarchical VPLS (HV-PLS), Asynchronous Transfer Mode (ATM) switch, Frame Relay, Ethernet Switch, and Resilient Packet Ring (RPR) switch. The communication channel between the node and the non-ERPS device is a uni-directional link or a bi-directional link or both.

Figure 1:
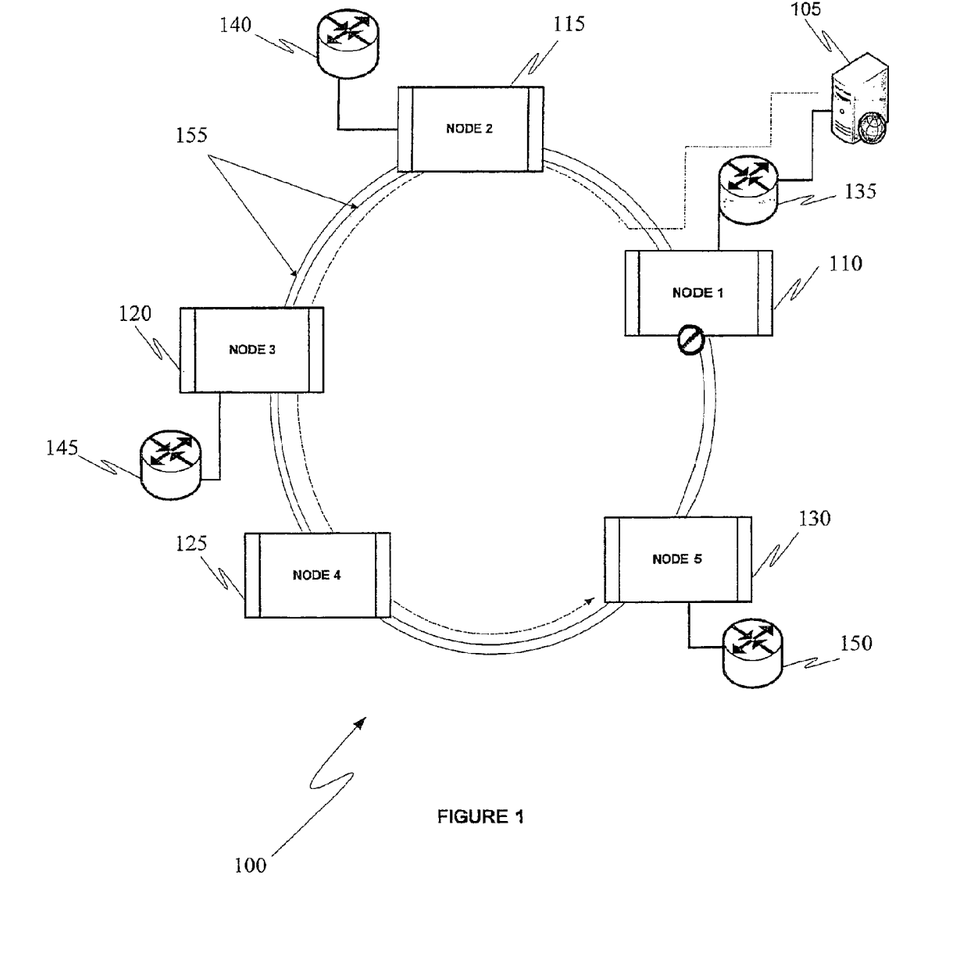
FIG. 1 shows an example of Ethernet Ring Protected Switching (ERPS) network in the Full Ring mode in normal operation.

FIG. 1 is a block diagram illustrating an Ethernet Ring Protection Switching (ERPS) system. The ERPS system 100 consists of a content server 105, nodes (110, 115, 120, 125 and 130), routers (135, 140, 145, 150), and a fiber 155.

The ERPS system 100 operates on a ring network. One node on the ring network is designated as the master node. Each node will have a primary port and a secondary port, both known to be able to send control traffic to the master node. Under normal operation only the primary port on the master node is used to avoid loops (the secondary port on the master node is blocked for all non-control traffic).

In operation, the nodes (110, 115, 120, 125 and 130) and routers (135, 140, 145 and 150) are connected by a bi-directional link 'not' shown in the figure. Nodes are interconnected as shown in a ring topology using two fibers 155, establishing bi-directional flow between them. The router may be or may include personal computer, mobile device, laptop and the device like. There is content server 105 attached to router 135 wants to communicate with router 140, 145 and 150. The content server may be or may include, for example, a mobile phone, a cellular phone, a handheld device, a computing device, a computer, a mobile computer, a portable computer, a laptop computer, a handheld computer, a handheld device, a PDA device, a handheld PDA device, a mobile or portable device, or the like. According to some aspects, the content server 105 may comprise a communication device connectable to one of the other devices/network via a wired or wireless connection.

Data traffic from the content server 105 flows to routers 140, 145 and 150 via 135, and intermediate nodes 110, 115, 120, 125 and 130 through the communication channel 155. The above example not limited to Point-to-Multipoint (P2MP) service, where the data traffic flows from one node to multiple nodes. It may be Point-to-point service as well. After forming a topology, ERPS software is run on all the Nodes. In the ERPS software there is a central node called RPL owner node which blocks one of the ports to ensure that there is no loop formed for the Ethernet traffic. The link which gets blocked by the RPL is called Ring Protection Link (RPL). The other node which is connected to the RPL is known as RPL-owner node. It uses control messages called Ring Automatic Protection Switching (RAPS) message to coordinate the activities of switching on/off the RPL link.

In the figure link between node 110 and node 130 is defined as RPL, and Node 110 is a RPL-owner. Once this is defined, ERPS software will block the port on Node 110 that is facing the node 130. This is called as RPL-block. Once RPL-owner is designated, RPL-link is identified and RPL is blocked which leads to a bridge network with no loops for traffic in the ring. Now data traffic from router 135 will flow into node 110. Node 110 will learn the MAC source address of router 135 on the port facing towards the same. The destination MAC address will not be present because network was newly set up. So Node 110 will broadcast the traffic on all available ports. Clearly in a single ring topology node 110 will have only one outgoing ring port. In multi ring topology there could be multiple outgoing ring ports. Node 115 will receive traffic on port facing node 110. Node 115 will learn the Source Address (SA) and broadcast on port facing node 120. If the port facing router 140 is part of P2MP service then node 115 will forward the traffic on to the port facing router 140, else it will not. However, it will continue to forward the traffic on the ERPS ring. This broadcast will continue till node 130. Finally, all routers will receive a copy of the P2MP service. ERPS protects traffic from failure of a link or node that form ring. Normally data traffic is sent over a Virtual Local Area Network (VLAN) ID that is different from ERPS control traffic. For example VLAN ID=1 could be used as ERPS control traffic and VLAN ID=2, 3, 4 and 5 could be used as data traffic. Continuity Check message (CCMs) and other Ring Automatic Protection Switching (RAPS) control information are sent with VLAN ID=1. Since CCM, RAPS and Data traffic can potentially flow through the same fiber, or through same duct but different fiber, continuity fault indicated by absence of CCM will with high probability imply data path fault. In other words, fault in CCM will be functionally linked with fault in all data VLAN IDs 2, 3, 4 and 5. That is, Fault in CCM will imply fault in data traffic and not otherwise. The CCM includes trail of frames or packets.

Figure 2:
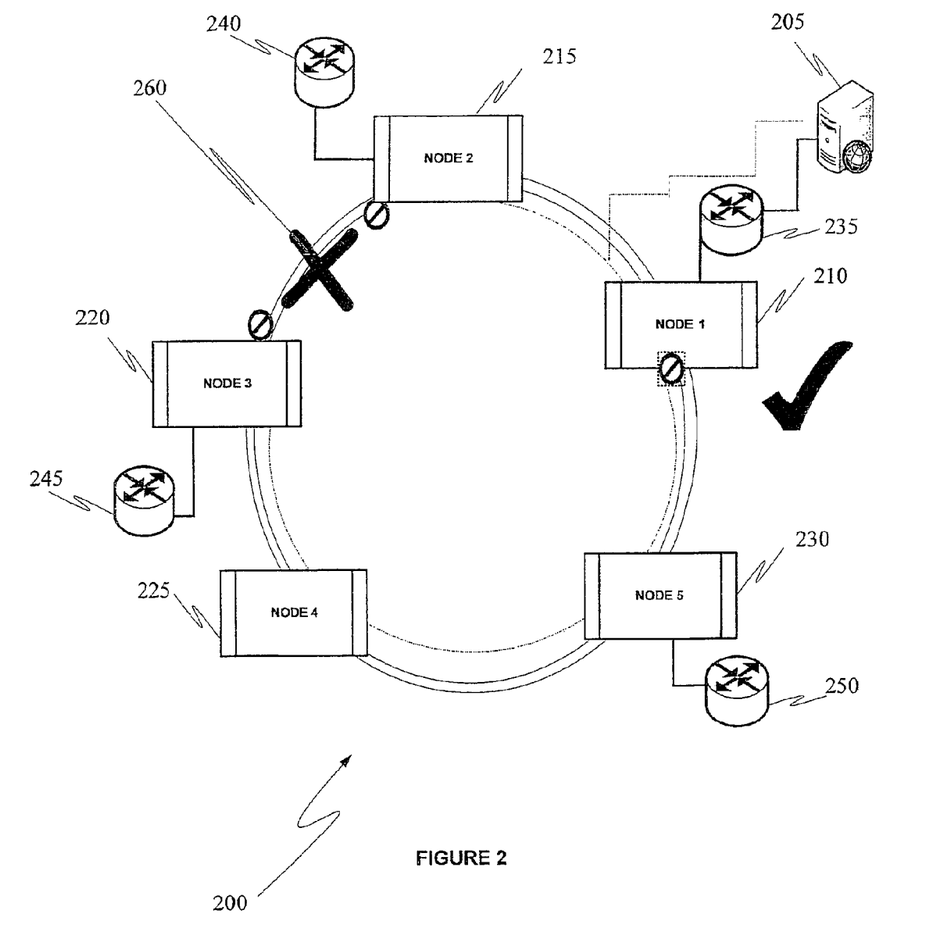
FIG. 2 shows an example of ERPS network shown in FIG. 1 in which a fault has occurred between two of the network nodes in the system.

FIG. 2 is a block diagram illustrating protection operation of ERPS when a fault has occurred between two of the network nodes in the system. Whether under fault or no fault scenario nodes will continue to exchange CCMs with adjacent nodes. Failure is detected when a node fails to receive CCMs from the adjacent nodes. Here in the system 200, the failure in the link is between the nodes 215 and 220 i.e. the CCM sent by node 215 to 220 is not received and vice versa. Fault 260 between the nodes can also be detected using Loss of signal (LOS) mechanism. Once the fault 260 is detected between nodes 215 and 220 leads to trigger the ERPS protection operation, where the ports of nodes 215 and 220 facing the faulty path are blocked and nodes adjacent to fault 260 will broadcast a signal failure (SF) message on the ring ports. In ERPS, SF is called as RAPS-SF meaning Ring Automatic Protection switching-SF, whenever a node receives RAPS-SF it will flush its Forwarding Data Base (FDB) entries and will forward the RAPS-SF onto the ring port. Now, momentarily the ring is broken into two parts or two linear trees. One path made between node 210 and 215, and the other path made of node 210, 230, 225 and 220. When RPL-owner receives the RAPS-SF message, it will unblock the block on RPL. Now, all the nodes are connected through a different chain (Node 215-Node 210-Node 230-Node 225-Node 220). When all nodes have flushed their FDB (i.e. erasing all the learnt MAC addresses) then whenever a new frame arrives at Node 210 it will broadcast it on the ring ports. Traffic to router 240 will flow through Node 210 and Node 215. Traffic to router 245 will flow through Node 210-Node 230-Node 225-Node 220. Traffic to router 250 will flow through Node 210-node 230. The duplication of frame happens at Node 210, wherein one of the frames flows towards Node 215 and other frame flows towards node 230. At node 230, duplication of frame happens again. One frame goes to router 250 and other frame goes to Node 220 and finally to router 245. Protection operation is complete.

Figure 3:
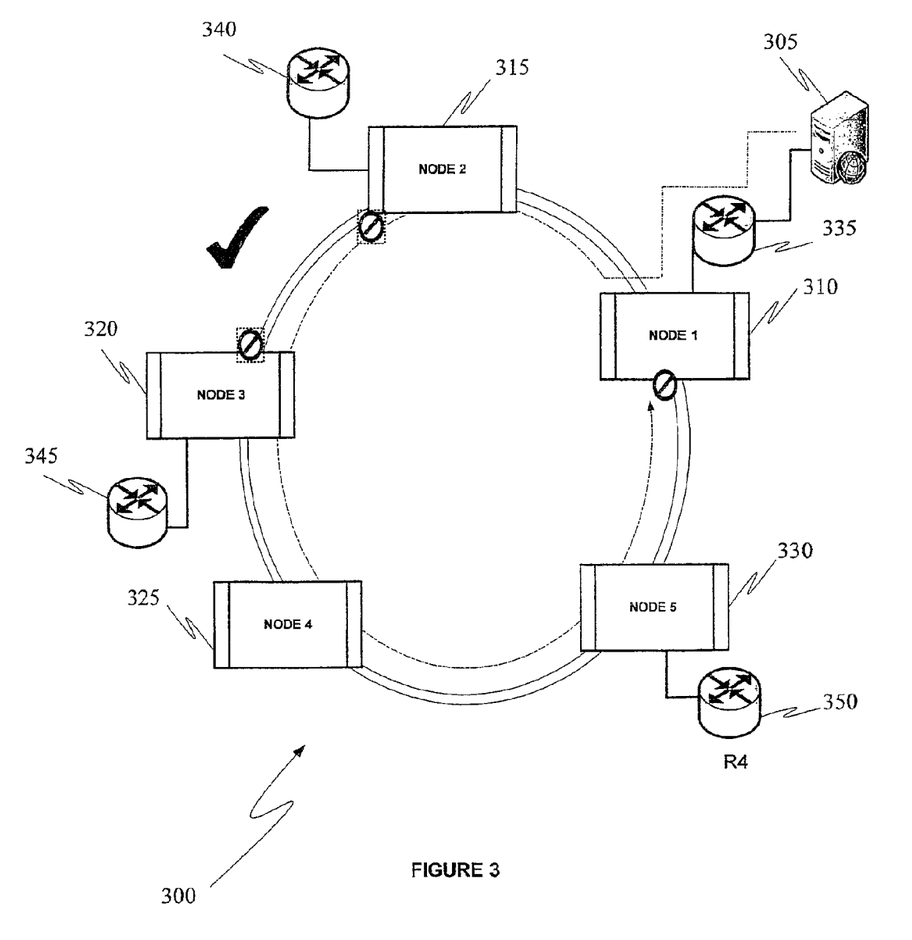
FIG. 3 shows an example of ERPS network shown in FIGS. 1 and 2 in which a fault is restored between two of the network nodes in the system.

FIG. 3 is a block diagram illustrating restoration operation of ERPS when a fault has occurred between two of the network nodes in the system. Whether under fault or no fault scenario Nodes will exchange Continuity Check Message (CCMs) with adjacent nodes. When link path between Node 315 and 320 recovers, CCMs exchanged between them will be received at both nodes. Node 315 and 320 will wait for a period, guard time, before sending RAPS-No Request message. This ensures that there is no intermittent fault. After expiry of guard time, Nodes 315 and 320 will send RAPS-No Request message, RAPS-NR. When RPL-owner receives RAPS-NR, the RPL-owner waits for a predetermined amount of time period called Wait-To-Restore-Time (WTR Time), and when timer expires it will block the RPL and send new RAPS message called RAPS-NR-RB (i.e. No Request, and Root has blocked the RPL). Momentarily, the chain is broken into two parts: Node 310-Node 315 and Node 330-Node 325-Node 320. Whenever a node receives RAPS-NR-RB message, nodes flush their FDB entries. If there is a port which has recovered from failure, then it will be first unblocked and then the entries in the FDB will be flushed. So at nodes 315 and 320, blocks will be removed and then FDB will be flushed. Now there is only one chain that originally existed during the normal operation of ERPS. Traffic from router 335 will follow the Path Node 310-Node 315-Node 320-Node 325-Node 330.

Figure 4:
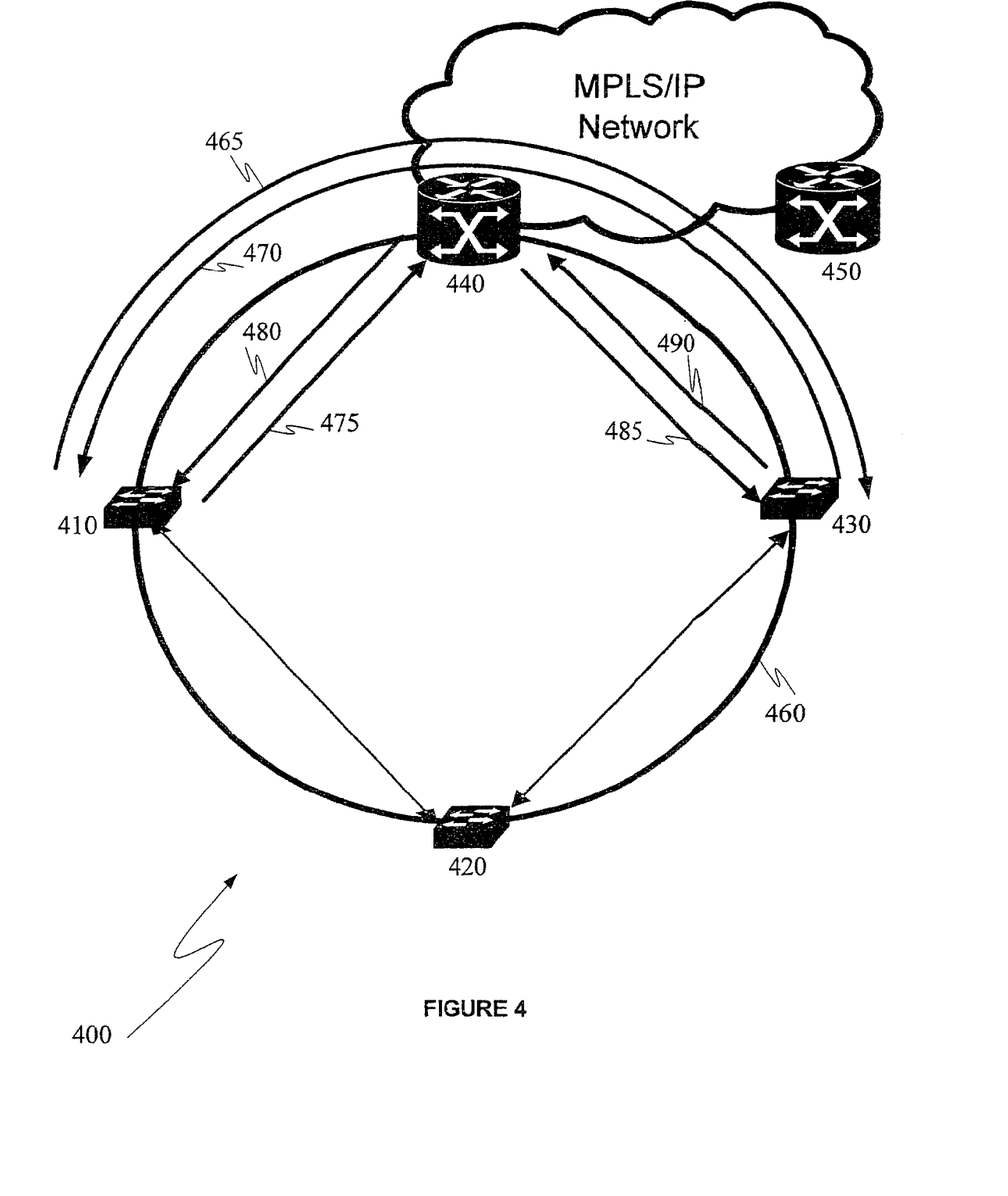

FIG. 4 is a functional diagram of two network nodes showing the preferred protection mechanism, where ERPS terminates on IP/MPLS nodes according to an embodiment of the present invention. The system 400 includes one or more nodes (410, 420, and 430), one or more routers (440 and 450), and one or more medium for communication (460). Further, as shown in FIG. 4, one or more nodes and routers are connected in a ring network. Particularly, the nodes 410, 420 and 430 are connected in an ERPS mechanism and router 440 and 450 are IP/MPLS nodes. The nodes 410, 420 and 430, and router 440 are connected through a communication medium (such as optical fiber, wireless, copper wire, cable etc.) for data transfer.

In one embodiment of the invention, the nodes that are connected through an ERPS mechanism terminate on one or more router. The invention is not restricting to ERPS mechanism or ERPS state machine or ERPS technology, but method also applies to any type of deployment of ERPS network, single ring or multi ring which terminates on the IP/MPLS network. In an example, referring FIG. 4 explains for single ring deployment, where the node 410 terminates on router 440. To terminate a ring on IP/MPLS router, one breaks the ring into a chain and then connects the two ends of the chain to the IP/MPLS routers. When a ring (ERPS) terminates on an IP/MPLS router 440, two router ports will be used. The router ports could be on same physical router or on same logical router or on physically separated routers or on logically separated routers. All the nodes and router are connected via bi-directional medium (for example fiber, wireless, copper, cable, etc.).

In the below mentioned operation method, Continuity Check Message (CCM) and Loss of Signal (LOS) are used for fault detection between the nodes in the ring network. Bi-directional CCM, with unicast or multicast MAC address specific to CCM, are used for fault detection between nodes 410 and 430, via the router 440. Also, LOS is used for fault detection between 410 and 440 and 430 and 440 as an example. Between bridges 410, 420 and 430 bi-directional CCM or bi-directional LOS are used for fault detection.

In a ring network where one or more nodes are connected to each other, each of the nodes transmits and receives CCM to check whether any communication failure has occurred within the network. If any of the nodes does not receive CCM from the other node, then there exists a fault in that path. The different mode of operation has been explained below under different condition of fault in different path during communication.

Operation 1: Uni-Directional Loss of Signal (LOS) Faults Towards Router 440 from Node 410

Referring to FIG. 4 (a), an example embodiment is shown when a uni-directional Loss of signal (LOS) faults occurs towards router 440 from node 410. In one mode of operation router 440 receives a Loss of signal (LOS) from a node 410, whenever there is a cut in the communication path between the router 440 and the node 410. The router 440 and the node 430 are unable to receive continuity check message (CCM) from the node 410, since there is a failure in the communication path due to cut in the fiber towards router 440 from the node 410. The node 430 will not receive any LOS from router 440, since the bi-directional links between router 440 and the node 430 is healthy. Even though node 430 does not receive CCM from node 410, the node 430 will not block its port towards the router 440. The node 430 will set a bit i.e. Remote Defect Indication (RDI) indicating the fault in the CCM and transmits the same to node 410. Transmission of RDI in the CCM is via router or tunneled through the router (i.e. tunneling through using some encapsulation method) or disjoint communication channel. Upon receiving RDI at the node 410, the node 410 will block its port towards router 440 and send signal fail (RAPS-SF) on both its ring ports.

Operation 2: Uni-Directional Loss of Signal (LOS) Fault Towards Node 410 from Router 440

Referring to FIG. 4 (*b*), an example embodiment is shown when a Uni-directional Loss of Signal (LOS) fault occurs towards node 410 from router 440. In one mode of operation, node 410 receives a Loss of signal from the router 440, whenever there is a cut in the communication path between the node 410 and the router 440. Based on the received LOS from the router 440, the node 410 will set a, RDI bit indicating the fault in the Continuity Check Message (CCM) and transmits the same towards the node 430 through router 440. The node 430 has not received any Loss of Signal from the router 440, since the bi-directional links between router 440 and the node 430 is healthy. The node 430 received CCM with RDI bit set equal to zero from node 410. Upon receiving the CCM with the RDI bit set equal to zero at node 430 from node 410, the node 410 will block the port towards router 440 and send Signal Fail (RAPS-SF) message on both its ring ports.

Operation 3: Bi-Directional Fault Between Node 410 and Router 440

Referring to FIG. 4 (*c*), an example embodiment is shown when a Bi-directional fault occurs between node 410 and router 440. In one mode of operation, node 410 receives a Loss of signal from the router 440 and does not receive Continuity check message (CCM) from node 430, whenever there is a cut in the communication path between the node 410 and the router 440. Since the fault is a bi-directional fault, for the present case, the router 440 also receives Loss of signal from node 410. The node 430 does not receive any CCM from node 410 through router 440 but has no Loss of signal from the router 440. The node 410 blocks it port towards router 440 and sends signal fail notification on both its ports.

Operation 4: Two Uni-Directional Faults Between Node 410 and Router 440; and Router 440 and Node 430

Referring to FIG. 4 (*d*), an example embodiment is shown when two uni-directional faults occurs between node 410 and router 440; and router 440 and node 430. In one mode of operation, node 410 receives Loss of Signal (LOS) from the router 440. The router 440 receives LOS from node 430. The node 410 does not receive any Continuity Check Message (CCM) from node 430. Since, the node fails to receive CCM from node 430, the node 410 set RDI bit on the CCM and transmits the same to node 430 through router 440. The node 430 receives CCM with the indication in the same that there is a fault at the receiving end. The node 430 is not aware of whether the fault is at router 440 or at the node 410. Since, the node 430 has not received any LOS from router 440; node 430 will not block his ports. The node 410 blocks its port towards router 440 and sends signal fail on both its ports.

Figure 5:
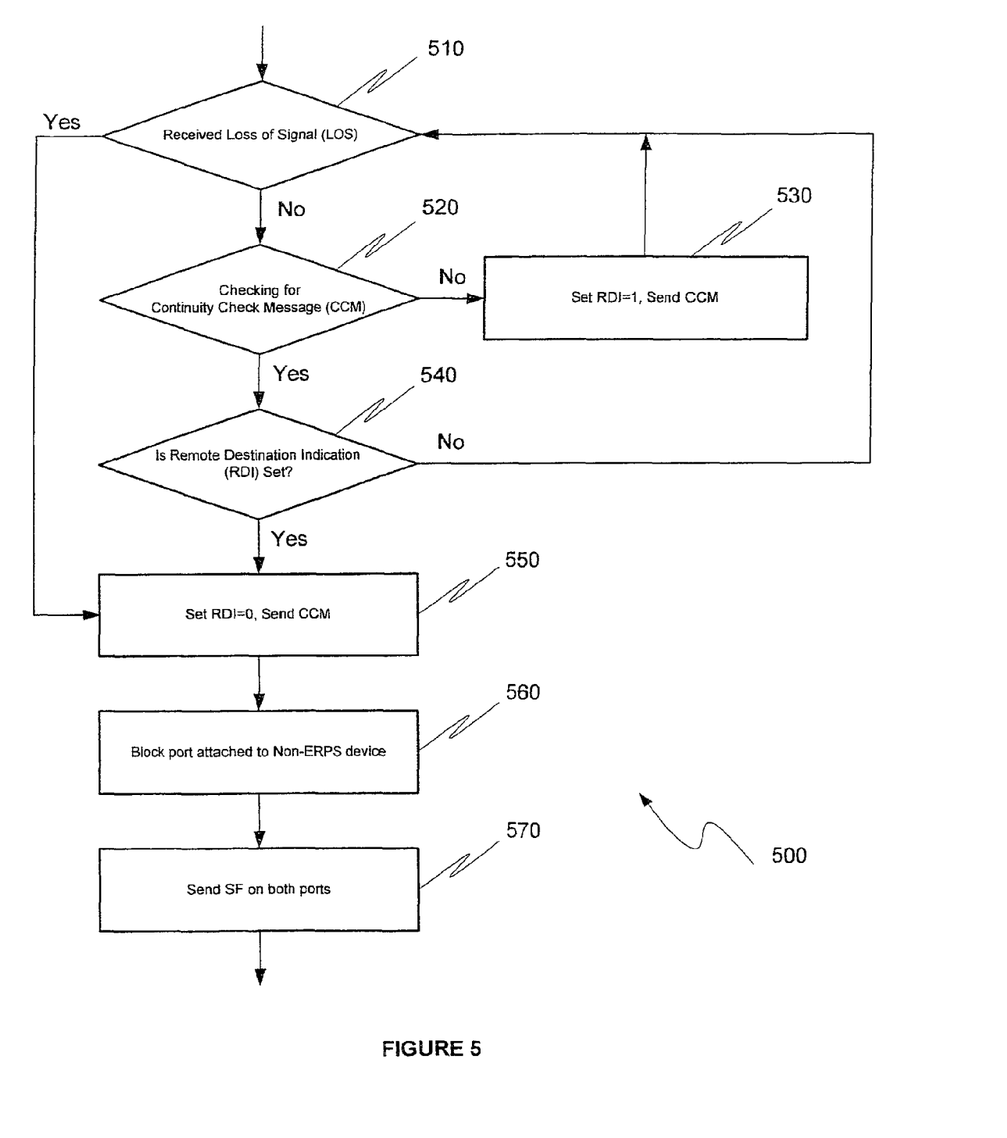
FIG. 5 is a state diagram illustrating operation of the protection mechanism shown in FIG. 4 in accordance with one embodiment of the present invention.

FIG. 5 shows a 50 ms protection switching method according to an embodiment of the invention. At least some part of the method may be implemented as a computer program stored on a computer-readable medium, such as firmware, for execution by a processor. Referring now to FIG. 5, there is illustrated a protection switching method 500 of a node having communication failure in a ring, in a communication network, where the communication failure occurred on one or more non-ERPS device or node or in a communication channel.

At step 510, the method checks for loss of signal (LOS) at the non-ERPS device or on one or more of the node in a communication channel. The LOS signal which is defined as per G.775 clause 4 is a received signal which is less than stipulated amount of the actual signal. If the non-ERPS device has received LOS then there is a fault in the communication channel and the state jumps to step 550.

At step 520, the method checks periodically, say every 10 ms, for unicast or multicast Continuity Check Message (CCM) at both the node, where the CCMs are periodically transmitted from both the node through one or more non-ERPS device. The CCM are transmitted and received by the nodes to check whether any fault is present in the communication channel. If the node fails to receive any LOS as well as CCM from the other node, then at step 530, the method set RDI=1 in the CCM subsequent to non receipt of LOS and CCM from the corresponding node, where the RDI=1 is a fault indication sent to the peer node.

At step 540, the method checks for value of RDI in the CCM subsequent to non receipt of LOS and receipt of CCM from the corresponding node. If the node has received LOS, then at step 550, the method set RDI=0 and send the CCM to the corresponding node. Based on the receipt of fault condition, the method at step 560 blocks the port of the node towards the non-ERPS device upon receipt of the fault notification and transmitting signal fail notification message on both the ports in the ring at step 570.

The main advantage of the correlation module or the above described method is without any modification in the function of non-ERPS device, the protection switching method can be executed. This can be accomplished by, whenever a failure has occurred in the link between the non-ERPS device and the node, the port of the node that is connecting to the non-ERPS device is blocked, where the blocking of ports of the node includes, when the non-ERPS device is not complied with ERPS standard (G.8032). The non-ERPS device does not need to block ports. The system with the above described correlation module or method will work without or with no change within existing IP/MPLS nodes.

Although the flowchart 500 includes steps 510-570 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 6:
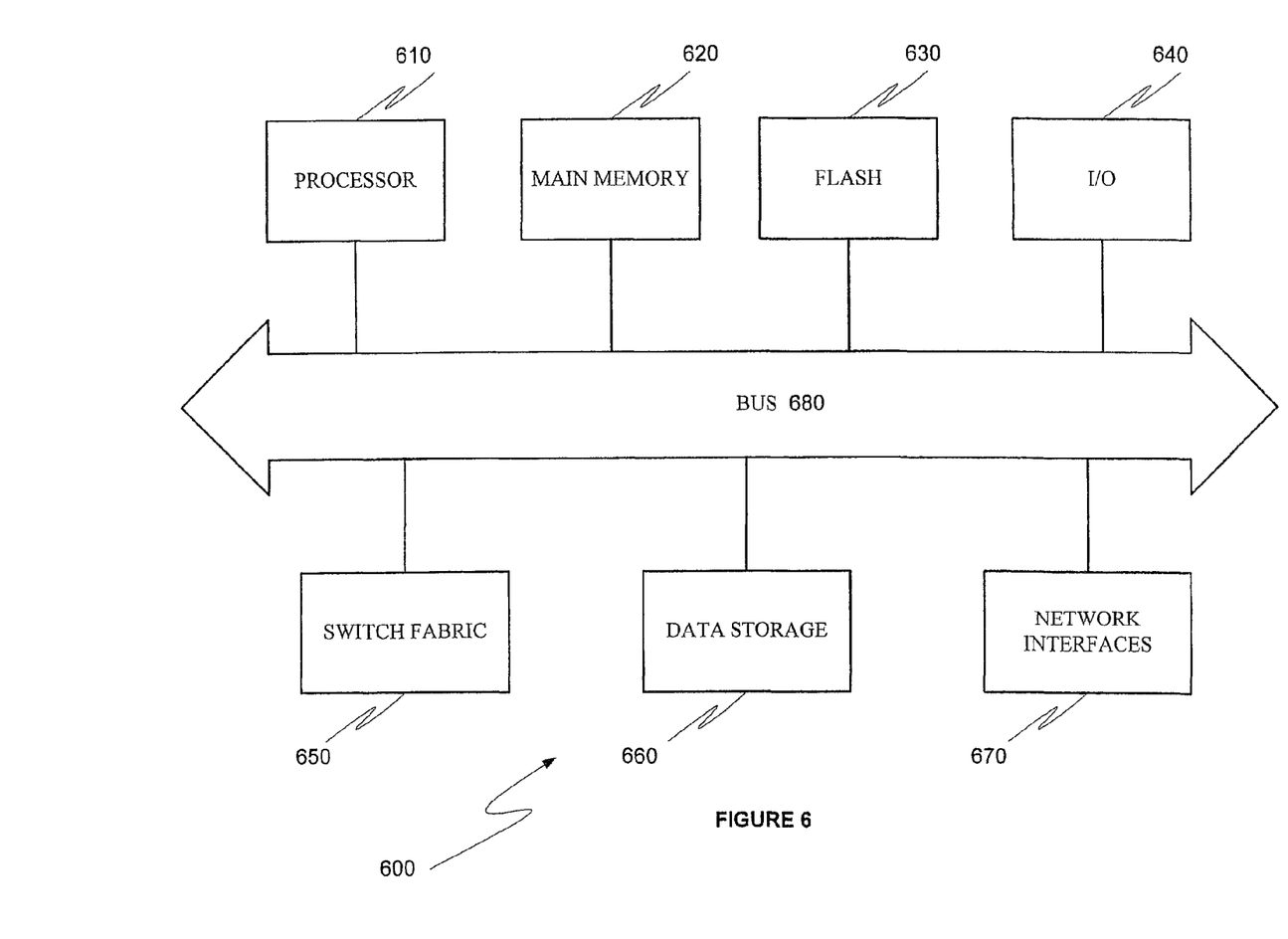
FIG. 6 illustrates one embodiment of a suitable computing environment in which certain aspects of the invention illustrated in FIGS. 1-5 may be practiced.

In the illustrated embodiment of FIG. 6, the protection switching method and system for of a node having communication failure in a ring, in a communication network, according to the present invention as discussed above may be implemented as a series of software routines run by computer system 600 of FIG. 6. These software routines comprise a plurality or series of instructions to be executed by a processing system in a hardware system, such as processor 610 of FIG. 6. Initially, the series of instructions are stored on a data storage device 660, memory 620 or flash 630. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a propagated data signal received from a remote storage device, such as a server on a network, via a network/communication interface 670. The instructions are copied from the storage device 660, such as mass storage, or from the propagated data signal into a memory 620 and then accessed and executed by processor 610.

In alternate embodiments, the present invention is implemented in discrete hardware or firmware. For example, one or more application specific integrated circuits (ASICs) could be programmed with the above-described functions of the present invention.

Accordingly, a method and system is described in which a protection switching prevents loops in a layer-2 ring network. From the foregoing description, those skilled in the art will recognize that many other variations of the present invention are possible. In particular, while the present invention has been described as being implemented in a metropolitan area network comprising multiple nodes or switches, it should be noted that some of the logic described herein may be distributed in other components of a network or implemented in a network of different scope such as a local area network without departing from the scope of the present invention.

FIGS. 1-6 are merely representational and are not drawn to scale. Certain portions thereof may be exaggerated, while others may be minimized. FIGS. 1-6 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A protection switching method of a first node having communication failure in a ring network, the communication failure having occurred on at least one of a non-Ethernet Ring Protection Switching (non-ERPS) device, a plurality of nodes, and a communication channel, the method comprising:

checking for receipt of a Loss of Signal (LOS) message from at least one of the non-ERPS device and the plurality of nodes in the communication channel of the ring network, the LOS message indicating that a received signal level is lower than a stipulated amount;

checking periodically for receipt of Continuity Check Messages (CCMs), the CCMs being separate from the LOS message and periodically transmitted and received among the plurality of nodes through at least one non-ERPS device, transparently;

appropriately setting a Remote Defect Indication (RDI) bit in CCMs generated from the first node and transmitting the CCMs through the non-ERPS device or over a disjoint communication channel, the RDI bit being set based on at least one of receipt of the LOS message or non-receipt of the LOS message, and the non-ERPS device being not capable of setting the RDI bit in CCMs;

checking for a fault condition based on the received CCMs and receipt or non-receipt of the LOS message; and in the fault condition, blocking a port of the first node connected to the non-ERPS device and transmitting a signal fail notification message on ports of the first node connected to the ring.

2. The protection switching method as claimed in claim 1, further comprising:

reverting traffic to a normal state upon recovery from the fault condition using a guard time and wait-to-restore timer.

3. The protection switching method as claimed in claim 1, comprising setting the RDI=0 in CCMs subsequent to non-receipt of the LOS message and receipt of CCMs from a corresponding bridge/switch.

4. The protection switching method as claimed in claim 1, comprising setting the RDI=1 in CCMs subsequent to non-receipt of the LOS message and CCMs from a corresponding node, the RDI=1 being an indication sent to a peer node that an error in CCM frames has been detected.

5. The protection switching method as claimed in claim 1, wherein the port of the first node connected to the non-ERPS device is blocked when the non-ERPS device is not in compliance with ERPS standard (G.8032).

6. The protection switching method as claimed in claim 1, wherein a communication channel between the node and the non-ERPS device is a uni-directional link or a bi-directional link, and the non-ERPS device is at least one selected from the group consisting of: an Internet Protocol/Multiprotocol Label Switching (IP/MPLS) router, an Asynchronous Transfer Mode (ATM) switch, a Frame Relay, an Ethernet Switch, and a Resilient Packet Ring (RPR) switch.

7. The protection switching method as claimed in claim 1, wherein the CCM includes a trail of frames or packets and the CCMs are transceived (IEEE 802.1ag) between the plurality of nodes without any modification in the function of the non-ERPS device.

8. A protection switching system of a first node having communication failure in a ring network, the communication failure occurring on at least one of: a non-Ethernet Ring Protection Switching (ERPS) device, a plurality of nodes, and a communication channel, the system comprising:
   a plurality of nodes interconnected in a ring topology forming the ring network, including a first node;
   at least one non-ERPS device within the ring, the non-ERPS device being not capable of setting a Remote Defect Indicator (RDI) bit in Continuity Check Messages (CCMs); and
   a network channel connected to each of the plurality of nodes via at least one of the non-ERPS device for transmitting and receiving CCMs,
   wherein the first node is configured to:
      determine a failure condition within the communication channel by:
         checking for receipt of a Loss of Signal (LOS) message from at least one of the non-ERPS device and the plurality of nodes in the communication channel of the ring network, the LOS message indicating that a received signal level is lower than a stipulated amount,
         checking periodically for receipt of CCMs, the CCMs being separate from the LOS message and periodically transmitted and received among the plurality of nodes through at least one non-ERPS device, transparently,
      appropriately set the RDI bit in its CCMs and transmit the same to each of the other plurality of nodes through the non-ERPS device or through a disjoint communication channel, in response to the failure condition, and
      block a port of the first node connected to the non-ERPS device in the failure condition, and transmit a signal fail notification message on ports of the first node connected to the ring network, in response to the failure condition.

9. The protection switching system as claimed in claim 8, wherein the first node is further configured to:
   set the RDI=0 in CCMs subsequent to non-receipt of the LOS message and receipt of CCMs from a corresponding node, and
   set the RDI=1 in CCMs subsequent to non-receipt of the LOS message and CCMs from a corresponding node, the RDI=1 being an indication sent to a peer node that an error in CCM frames has been detected.

* * * * *